United States Patent [19]

Mazziotti et al.

[11] 4,147,225
[45] Apr. 3, 1979

[54] VEHICLE DRIVE SYSTEM

[75] Inventors: Philip J. Mazziotti, Toledo, Ohio; Donald E. Hobson, Grabill, Ind.

[73] Assignee: Dana Corporation, Toledo, Ohio

[21] Appl. No.: 878,827

[22] Filed: Feb. 17, 1978

[51] Int. Cl.² .................. B60K 17/34; B60K 23/04
[52] U.S. Cl. ...................... 180/44 R; 74/665 F; 74/665 GA; 74/665 H
[58] Field of Search ............ 180/44 R, 24.09; 74/665 F, 665 GA, 665 GD, 665 H, 665 S, 665 T, 700, 713, 412, 694

[56] References Cited

U.S. PATENT DOCUMENTS

| | | | |
|---|---|---|---|
| 783,168 | 2/1905 | Baker | 74/713 |
| 904,774 | 11/1908 | Gulick | 74/700 |
| 1,132,861 | 3/1915 | Montine | 180/44 R |
| 1,186,409 | 6/1916 | McGill | 74/694 X |
| 1,191,295 | 7/1916 | Fromm | 180/44 R |
| 1,643,476 | 9/1927 | Thorp | 74/710 |
| 1,711,128 | 4/1929 | Robbins | 180/24.09 |
| 1,744,179 | 1/1930 | Tibbetts | 74/713 |
| 2,223,522 | 12/1940 | Kysor | 74/665 H |
| 2,228,581 | 1/1941 | Olen | 180/44 R X |
| 2,407,675 | 9/1946 | Morgan | 180/22 |
| 2,466,934 | 4/1949 | Dellenbarger | 74/665 H |
| 2,874,814 | 2/1959 | Beck | 180/44 X |
| 3,262,331 | 7/1966 | Breuer | 74/412 |
| 3,557,634 | 1/1971 | Bixby | 180/44 R |
| 3,763,947 | 10/1973 | Longshore | 180/44 R |
| 4,050,534 | 9/1977 | Nelson | 180/24.09 |

*Primary Examiner*—Kenneth H. Betts
*Attorney, Agent, or Firm*—Wilson, Fraser & Clemens

[57] ABSTRACT

A vehicle drive system for driving the front and/or the rear wheels of a vehicle wherein the power is transmitted from the rear axle to the front axle by cross-axis gearing mounted on the rear input pinion shaft which meshes with the driven cross-axis gearing connected to a forwardly extending propeller shaft.

3 Claims, 7 Drawing Figures

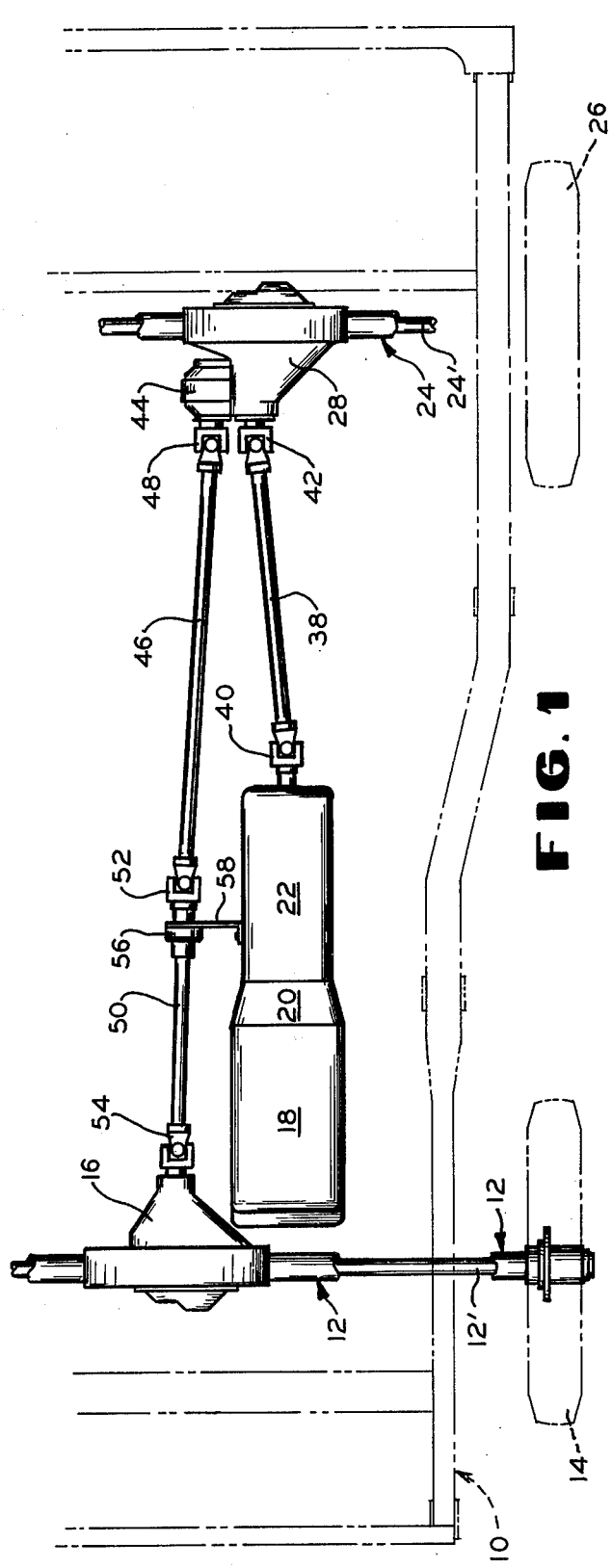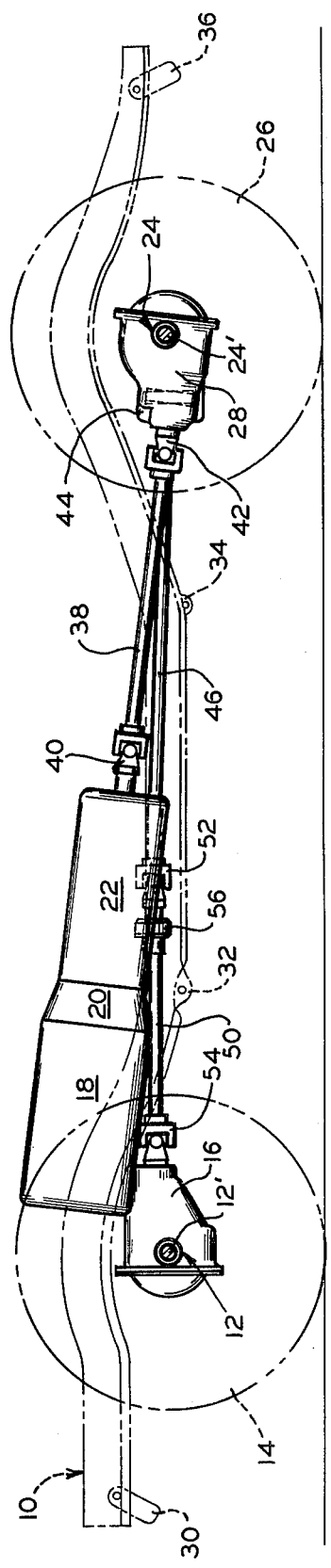

VEHICLE DRIVE SYSTEM

BACKGROUND OF THE INVENTION

The present invention relates to drive axle systems for front and rear wheel drive vehicles, and more particularly, to an improved system for transmitting torque to the front drive wheels of a vehicle.

Automotive vehicles wherein the engine is connected to drive both front and rear axles have recently been developed widely especially in view of increasing demand for off-the-road automotive type vehicles. Most of these vehicles include transfer case mechanisms wherein the propeller shaft from the engine is drive connected to the front and rear drive axles. These transfer cases usually contain a large number of gears and bearing which make them expensive and add considerably to the cost of the vehicle. Also, such transfer cases are heavy and bulky and are mounted at the side of the housing of the transmission. Manifestly, these features adversely affect the fuel economy of the attendant vehicle due to the weight factor and the aerodynamic aspect of a comparatively bulky profile caused by the placement of the transfer cases adjacent to the transmission housing thereby limiting the lowering of the floor of the vehicle.

It is a primary object of the present invention to produce a simple, inexpensive drive arrangement between the engine driven propeller shaft and the front and rear axles by eliminating the usual transfer case and thereby permitting a reduction in overall vehicle weight and a lowering of the vehicle profile.

Another object of the invention is to produce a novel drive mechanism for driving the front and rear drive wheels of a vehicle.

Another object of the invention is to produce a novel drive mechanism employing cross-axis gears for driving the front wheels of a vehicle.

Still another object of the invention is to produce a drive mechanism for a vehicle which employs a minimum number of moving parts to enable a reduction in overall vehicle weight.

BRIEF DESCRIPTION OF THE DRAWINGS

The above objects, features, and advantages of the invention will become readily manifest to one skilled in the art from reading the following detailed description of a preferred embodiment of the invention when considered in the light of the accompanying drawings, in which:

FIG. 1 is a fragmentary top plan view of a drive system of a four wheeled vehicle embodying the features of the present invention;

FIG. 2 is an elevational view of the drive system illustrated in FIG. 1;

DETAILED DESCRIPTION OF PREFERRED EMBODIMENT

Figure 4:
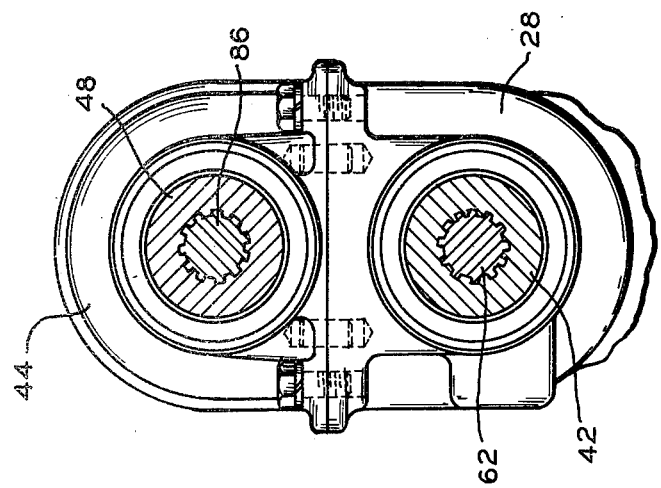
FIG. 4 is a sectional view of the drive mechanism illustrated in FIG. 3 taken along line 4—4 thereof.
Figure 3:
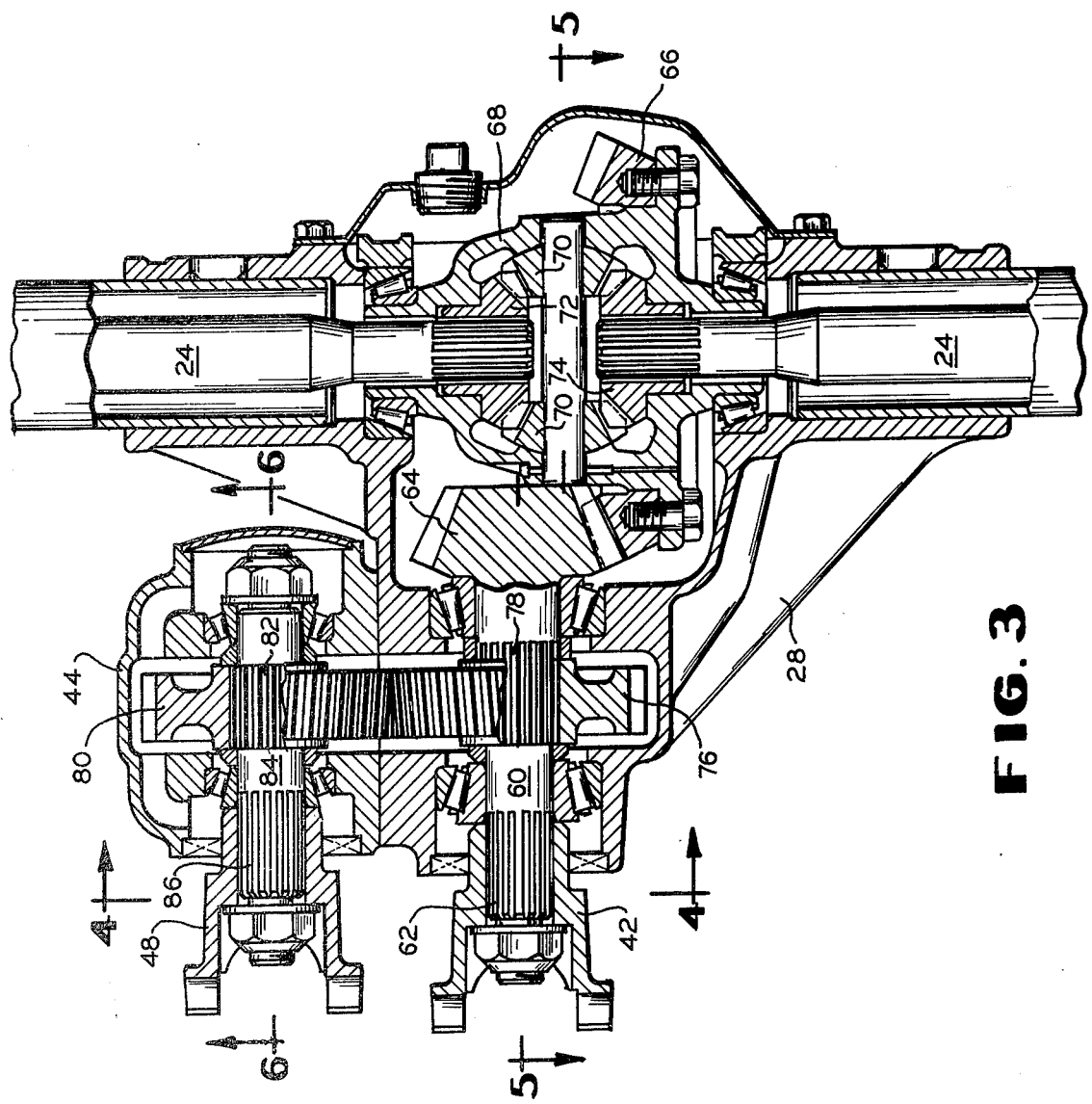
FIG. 3 is an enlarged fragmentary view partially in section of the rear axle drive mechanism illustrating the crossed-axis gear arrangement for transmitting the power from the rear axle to the front axle.
Figure 5:
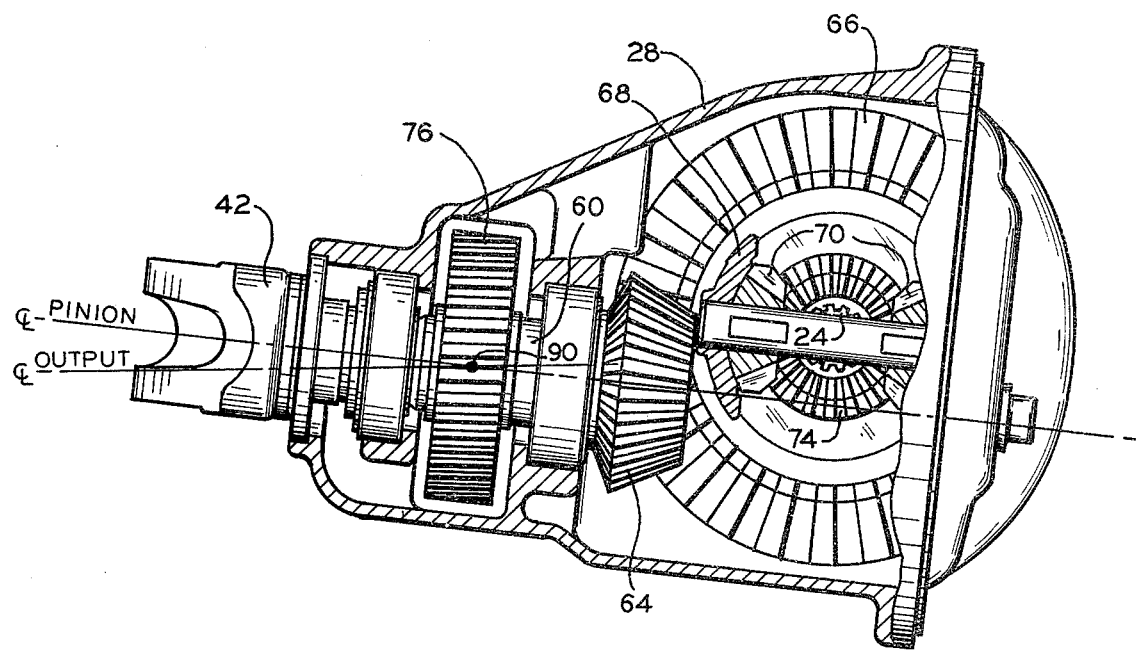
FIG. 5 is a sectional view of the drive mechanism illustrated in FIG. 3 taken along line 5—5 thereof.

Referring to the drawings, and more particularly, to FIGS. 1 and 2, there is illustrated, in phantom lines, a vehicle chassis 10 supported at its forward end by a front drive axle assembly 12 having an axle shaft 12' supported at opposite ends by conventional ground engaging tired wheels 14 and formed intermediate its ends with a suitable differential housing 16. An internal combustion engine 18 of the conventional type is suitably mounted within the forward portion of the frame 10. Extending rearwardly of the engine 18 is a usual clutch 20 and a transmission 22. It will be observed that the assemblage of the engine 18, clutch 20, and the transmission 22 is mounted so that the centerline thereof is laterally offset with respect to the centerline of the frame 10 and tends to incline rearwardly.

The front wheels 14 are coupled to the respective axles 12' by means of an automatically and manually actuated hub lock as illustrated and described in U.S. Pat. No. 3,414,096 entitled "AUTOMATIC AND MANUAL MEANS FOR HUB CLUTCH" in the name of George R. Reed and assigned to DANA CORPORATION. Such mechanism as therein described includes a hub clutch for use with the rotating hub of the front vehicle wheel 14 with both an automatic and a manual engaging means, to alternately prevent and permit free wheeling of the front wheels 14.

The rearward end of the frame 10 is supported by a rear drive axle assembly 24 having an axle shaft 24' supported at opposite ends by conventional ground engaging tired wheels 26 (shown in FIG. 2) and formed intermediate its ends with a suitable differential housing 28.

The suspension between the axle assemblies 12 and 24 and the frame 10 may comprise any suitable suspension system such as a leaf-type spring assembly. The front spring assemblies (not shown) are designed so that the intermediate portions thereof are coupled to the front axle while the front and rear terminal portions are suitably connected to the frame 10 through front and rear shackles 30 and 32, respectively. In a like manner the rear spring assemblies (not shown) are designed so that the intermediate portions thereof are coupled to the rear axle while the front and rear terminal portions are suitably connected to the frame 10 through front and rear shackles 34 and 36, respectively.

An engine driven propeller shaft 38 is drivingly connected to the output shaft of the transmission 22 by universal coupling 40. The opposite end of the propeller shaft 38 is drivingly connected to the input shaft of the rear differential 28 through a universal coupling 42. Power transmitted to the input shaft of the rear differential 28 is delivered to the front axles 12 by a gear arrangement partially housed within a housing or gear case 44 and specifically described and illustrated with respect to FIGS. 3, 4, 5 and 6. More specifically, the gear arrangement within the housing 44 transmits power to a forwardly extending propeller shaft 46 through a universal coupling 48. The opposite end of the propeller shaft 46 is coupled to the front differential 16 through a propeller shaft 50 one end of which is connected to the propeller shaft 46 through a universal coupling 52. The opposite end of the propeller shaft 50 is connected to the differential 16 through a universal coupling 54. The propeller shaft 50 is rotatably supported by a journal member 56 secured by bracket means 58 to the transmission housing 22. The journal member 56 adequately supports the propeller shaft 50 and permits rotational movement thereof and simultaneously permits relative axial movement of the shaft 50 required by the movement of the front and rear axle assemblies during use.

Referring to FIGS. 3, 4, 5 and 6 an input shaft 60 of the rear differential 28 is provided with a spline portion 62 at its forward end which is in splined engagement with the internal splines of the universal coupling 42. The opposite end of the input shaft 60 is provided with a pinion gear 64 adapted to mesh and drive a ring gear 66 which carries its spider 68. The spider 68 includes a plurality of planet pinions 70 which are in meshing engagement with opposed side gears 72 and 74 which are splined to left and right portions of the rear axle 24.

The input shaft 60 transmits input torque to the rear axle 24 through the gearing arrangement described above, and also transmits input torque to the front axle 12 through a power divider which includes a crossed-axis gear 76. The input shaft 60 is provided with a splined portion 78 intermediate the splined portion 62 and a pinion gear 64 which is in splined engagement with the internal splines of the crossed-axis gear 76.

A crossed-axis gear 80 housed within the gear case 44 is in meshing engagement with the crossed-axis gear 76. The crossed-axis gear 80 is in splined engagement with a splined portion 82 of an output shaft 84 which is journalled within the gear case 44. The outer end of the output shaft 84 is provided with a splined portion 86 which is in splined engagement with the internal splines of the universal coupling 48.

It will be observed, particularly from an examination of FIGS. 1 and 2, that the propeller shaft 38 which transmits torque from the output of the transmission 22 to the input of the rear differential 28 is at an angle with respect to the horizontal and at an angle to the centerline of the vehicle, and the propeller shafts 46 and 50, which transmit torque to the front differential 16, are generally horizontal and at only a slight angle to the centerline of the vehicle. In order to compensate for the relative angular displacement, the axis of the input shaft 60 and the axis of the output shaft 84 are at an angle to one another and maintained in such relationship by maintaining the respective housings of the rear differential 28 and the gear case 44 and their associated bearings in fixed position as illustrated. It will be appreciated that the desired angular relationship is maintained by a series of bolts 88 shown in FIG. 6 which extend through suitable holes formed in the housing of gear case 44 and which are adapted to align with internally threaded holes in the rear differential 28. It will be appreciated that the angular relationship between the input and output shafts is made possible through the utilization of the meshing crossed-axis gears 76 and 80.

Further, it will be appreciated that by utilizing automatically and manually operable hub locking means of the type illustrated and described in U.S. Pat. No. 3,414,096, for example, the power can be selectively transmitted to the front wheels 14 by actuation thereof when off-the-road operation of the vehicle is desired. For normal highway use, the front wheels 14 would in a free wheeling mode.

In the event that it is desired to adapt the drive system described above for a vehicle having different overall dimensions, the bolts 88 are caused to be removed and the housing or gear case 44 is then rotated in the desired direction, causing another set of holes in the differential 28 to align with the holes in the gear case 44 which manifestly causes the input and output shafts 60 and 84, respectively, to assume a different angular relationship. The moment about which the above rotation occurs lies within the confines of the crossed-axis gears 76 and 80 and generally identified by reference number 90. The rotation of the gear case 44 with respect to the differential 28 may be accomplished with the selection of a new set of meshing crossed-axis gears 76 and 80.

Figure 7:
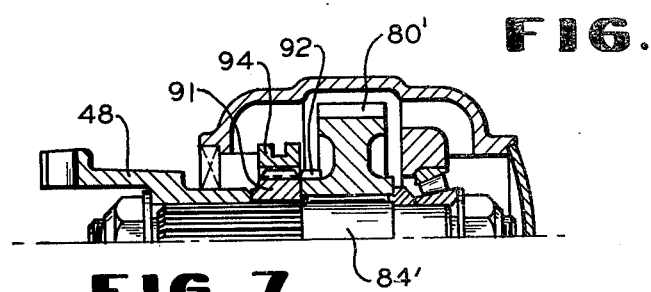
FIG. 7 is a partial fragmentary sectional view of modification of the mechanism illustrated in FIG. 6 showing a clutch for selectively delivering power to the front wheels through the associated universal joint.
Figure 6:
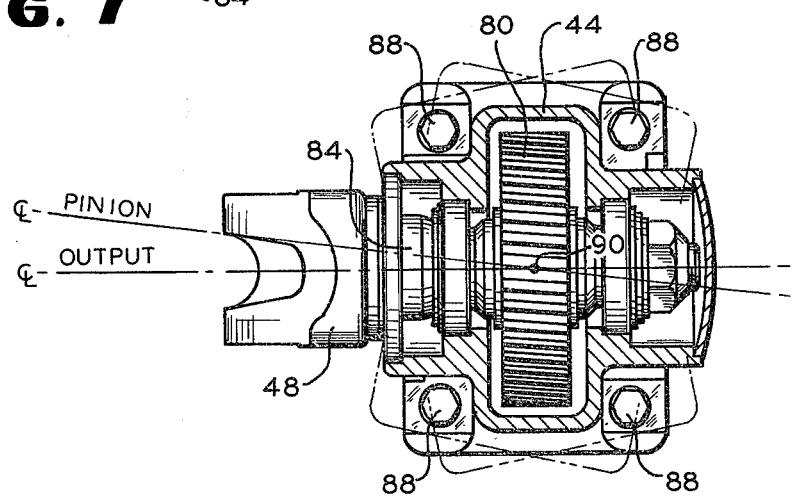
FIG. 6 is a sectional view of the mechanism illustrated in FIG. 3 taken along line 6—6 thereof.

When a vehicle equipped with the above-described drive system is utilized for highway use, and it is desired to reduce the number of rotating parts to a minimum to effect the desired economy of operation, it may be desirable to insert a disconnect mechanism between the crossed-axis gear 80 and the associated universal coupling 48, as illustrated in FIG. 7. Such disconnect mechanism can be of the type which can be actuated while the vehicle is in motion, thereby enabling the operator to shift from two wheel drive, i.e. transmitting torque only to the rear axle, to four wheel drive where a portion of the torque delivered to the input shaft 60 is transmitted to the front axle through the meshing crossed-axis gears. The mechanism for achieving this objective includes a clutch ring 91 splined to a shaft 84', radially outwardly extending teeth 92 integral with a crossed-axis gear 80', which is free to rotate on the shaft 84', and a shiftable clutch collar 94. Thus, by shifting the clutch collar 94 from the position shown in FIG. 7 to the right, the crossed-axis gear 80' and the universal coupling 48 will be in power transmitting relation. When the torque is delivered to both the rear axles and the front axles, the associated vehicle is useful for off-the-road operation. Most automatic type vehicles pesently in use for off-the-road operation have relatively high centers of gravity making them extremely unstable and often times permitting the vehicle to actually roll over due to the uneven terrain. It has been found by utilizing the drive system of the present invention, the usual transfer case mechanism may be eliminated allowing the entire spring mass of the vehicle to be lowered as much as seven inches, resulting in a vehicle having a great deal more stability and lowering the sillouette to reduce wind resistance and thereby achieve considerably greater fuel economy. The lowering of the vehicle is achieved without encroaching upon the passenger space. Furthermore, the drive system of the present invention minimizes the angles between the various pairs of shafts connected by universal couplings thereby reducing the potential for vibrations which could be transmitted to the vehicle frame and passengers.

In accordance with the provisions of the Patent Statues, we have explained the principle and mode of operation of our invention and have illustrated and described what we now consider to represent its best embodiment. However, it must be understood that within the spirit and the scope of the appended claims, the invention may be practiced otherwise than as specifically illustrated and described.

We claim:

1. In a vehicle having front and rear drive wheels, the improvement comprising:
   an engine driven first propeller shaft;
   a first differential unit having an input shaft with one end coupled to said propeller shaft and the other end connected to a pinion gear for transmitting torque to the rear drive wheels;

a first crossed-axis drive gear mounted on said input shaft;

an output shaft;

a second crossed-axis drive gear mounted on said output shaft laterally of and meshed with said first crossed-axis gear;

a second differential unit including a pinion gear for transmitting torque to the front drive wheels;

a second propeller shaft coupling said output shaft to said second differential unit pinion gear and;

means for selecting one of a plurality of predetermined angular relationships between said input shaft and said output shaft, said means including a gear case for housing said output shaft and said second crossed-axis gear, said gear case having a plurality of bolt receiving holes formed therein, and a plurality of bolts inserted through said holes and threadably engaged with one of at least two sets of internally threaded holes in said first differential unit.

2. The invention according to claim 1 wherein said second crossed-axis gear is rotatably mounted on said output shaft and including means for selectively coupling said second crossed-axis gear to said second propeller shaft.

3. The invention according to claim 2 wherein said selective coupling means includes a clutch ring mounted on said output shaft and a selectively shiftable clutch collar for coupling said clutch ring to said second crossed-axis gear.

* * * * *